Sept. 20, 1960 E. A. RICHARDS 2,953,038
TRANSMISSION
Filed Dec. 26, 1956 5 Sheets-Sheet 1

Inventor:
Elmer A. Richards
By:
Donald W. Banner Atty

Sept. 20, 1960

E. A. RICHARDS 2,953,038

TRANSMISSION

Filed Dec. 26, 1956

Inventor:
Elmer A. Richards
By:
Donald W. Banner Atty.

Sept. 20, 1960 E. A. RICHARDS 2,953,038
TRANSMISSION
Filed Dec. 26, 1956 5 Sheets-Sheet 5

Inventor:
Elmer A. Richards
By:
Donald W. Banner Atty

United States Patent Office 2,953,038
Patented Sept. 20, 1960

2,953,038

TRANSMISSION

Elmer A. Richards, Rockford, Ill., assignor to Borg-Warner Corporation, Chicago, Ill., a corporation of Illinois Filed Dec. 26, 1956, Ser. No. 630,668

14 Claims. (Cl. 74—730)

The present invention relates to power transmitting mechanisms, and more particularly to power transmitting mechanisms of the type comprising a prime mover, a change speed gearing and a hydrodynamic torque converter particularly characterized in that the elements are arranged in the named order.

It is common practice to employ torque transmitting mechanisms or drive trains in association with engines of various types which incorporate a hydrodynamic torque converter having fixed blading. In selecting the proper torque converter for such an arrangement, it is desirable that the size and absorption characteristics of the torque converter are such as to provide optimum characteristics under all the conditions in which the vehicle, or other device in which the power train is disposed, will be operated. Inasmuch as, however, a torque converter having fixed angle blading inherently cannot operate to provide for such optimum performance for both high and low converter output speed conditions, the conventional converter must be the result of a compromise in terms of size and absorption characteristics which will give the best overall performance; the result of such a compromise selection is, however, that the torque converter cannot provide optimum performance at either high or low output converter speed conditions.

The present invention is, in its broader aspects, directed to mechanisms for effecting a relationship between the torque converter and the prime mover (engine) associated therewith in such a way that peak converter performance may be obtained over the whole torque converter output speed range. This has been determined to be of particular importance under conditions in which power is utilized not only to drive the vehicle, but also is taken directly from the engine intermittently to operate auxiliary equipment which requires large amounts of horsepower. In conventional equipment of this type, the converter employed is matched to the engine in such a way as to take the full engine power when the engine is used to drive the vehicle; however when such auxiliary equipment is employed, which drains power from the engine, the converter becomes mismatched with respect to the engine and acts as a drag upon it which results in decreased engine speed and consequently poor performance. This condition cannot be corrected by employing a smaller torque converter, inasmuch as such a selection would result in poor performance when the auxiliary equipment was not being operated.

With devices constructed in accordance with the present invention, however, a converter may be selected which is so matched to the engine as to accept the full engine power during conditions in which the engine is employed only to drive the vehicle, and a speed shift mechanism is disposed between the engine and the converter which may be activated during operation of the auxiliary equipment, the net result being the achievement of optimum performance during conditions in which the engine drives the vehicle only, and in which the engine both drives the vehicle and operates the auxiliary equipment. By utilization of such a speed shift mechanism between the engine and the converter, not only can two definite converter drive ratios be selected, but in addition the overall performance of the power train through the vehicle may be materially increased.

It is therefore one object of the present invention to provide new and improved power transmission mechanisms which comprise a hydrodynamic torque converter connected to the engine through a speed change mechanism.

Another object is the provision of a device in accordance with the preceding object in which power takeoff mechanisms are associated with the speed change mechanism.

Another object is the provision of a device in accordance with the preceding objects in which a direct driving connection between the engine and converter may be maintained at all times.

Other objects and features of the invention will be readily apparent to those skilled in the art from the specification and appended drawings illustrating certain preferred embodiments in which.

Figure 2:
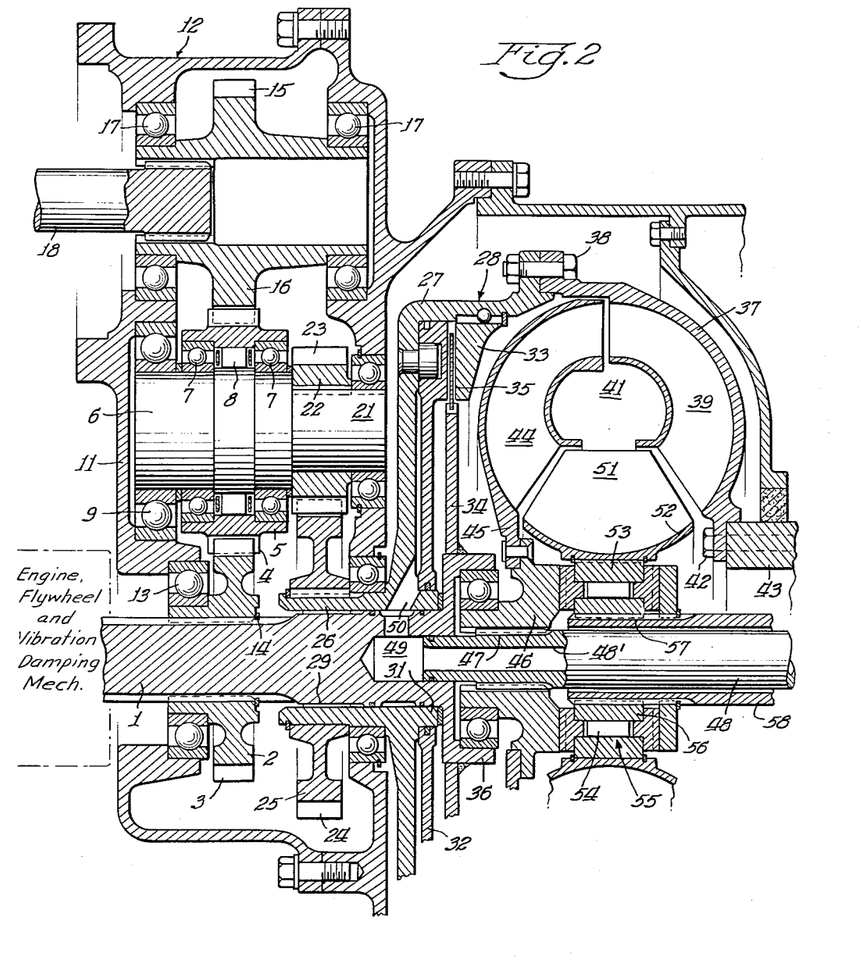
Figure 2 is a partial longitudinal sectional view through the hydrodynamic torque converter and speed change mechanism associated therewith incorporating the principles of the present invention.

Referring initially to the embodiment of the present invention as illustrated in Figure 2, there is disclosed therein an input shaft 1 driven by an engine adapted to serve as the prime mover of the vehicle in which the device incorporating the present invention is disposed. The shaft 1 has splined thereto a gear 2 having external teeth 3 disposed in meshing engagement with external teeth 4 on an associated gear 5. The gear 5 surrounds a shaft 6, and disposed therebetweeen are suitable bearing means 7. Also disposed between the inner diameter of the gear 5 and the outer diameter of the gear 6 is a one-way clutch 8 which may, for example, be of the type illustrated in the copending patent application of Harry P. Troendly et al., Serial No. 379,534 filed September 11, 1953, entitled "One-Way Clutch," now Patent No. 2,824,636 dated February 25, 1958. The one-way clutch 8 essentially comprises a plurality of tiltable grippers adapted to permit, when tilted in one direction, relative rotation between the gear 5 and the shaft 6 in one direction, and adapted further, when tilted in the opposite direction, to wedge between the gear 5 and shaft 6 to provide a driving connection therebetween preventing relative rotation therebetween in the opposite direction. The forwardmost part of the shaft 6 has associated therewith suitable bearing means 9 disposed between the shaft 6 and a forward portion 11 of an outer housing 12, other bearing means 13 also being disposed in engagement with the housing portion 11 and with the gear 2 to prevent axial forward movement of that gear, axial rearward movement being presented by a snap ring 14.

Figure 1:
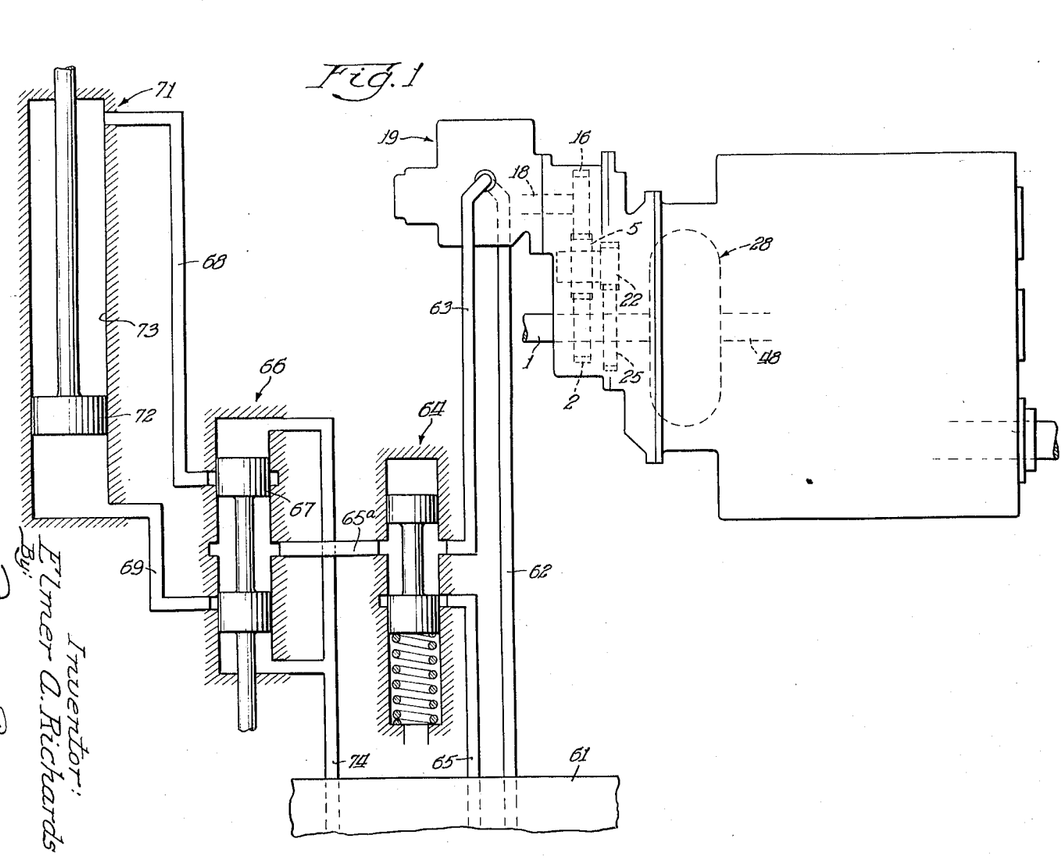
Figure 1 is a diagrammatic representation of a device constructed in accordance with the present invention associated with auxiliary power takeoff equipment.

The teeth 4 of the gear 5 are in constant meshing relation with teeth 15 externally provided on a gear 16 which is rotatably supported on the housing 12 by suitable bearing means 17. Splined to the forwardmost, internal portion of the gear 16 is a shaft 18 connected to drive a fluid pump 19 (Figure 1).

It will be readily understood by those skilled in the art that when the engine drives the shaft 1, the gear 2 effects rotation of the gear 5, which in turn effects rotation of the shaft 6 through the one-way clutch 8. Rotation of the gear 5 at all times effects rotation of the gear 16, consequent rotation of the input shaft 18 of the fluid pump 19.

As illustrated in Figure 2, shaft 6 is provided with a reduced end portion 21 to which is splined a gear 22 having external teeth 23 thereon. The teeth 23 are in constant meshing engagement with external teeth 24 of a gear 25. An internal portion of the gear 25 is splined to a forwardly extending flange 26 integral with the forwardmost portion 27 of a torque converter housing 28. The flange 26 is rotatably mounted about the shaft 1 by means of needle bearings 29. The portion 27 of housing 28 further comprises a rearwardly extending annular flange portion 31, and mounted thereon for axial movement is an annular piston 32, suitable sealing means being provided between the piston 32 and the flange 31; piston 32 being spaced slightly from the adjacent radially extending part of housing portion 27. Spaced rearwardly from the piston 32 and connected to the housing portion 27 is an abutment plate 33 fixed against axial rearward motion relative to the housing 28 by suitable snap ring means. Disposed between the piston 32 and the abutment means 33 is an annular clutch plate 34 carrying at its outer periphery an annular ring of friction material 35 disposed between the outermost portion of the piston 32 and the abutment 33, as clearly indicated in Figure 2. The clutch plate 34 is fixedly mounted by suitable means, such as welding, to an annular flange 36 radially spaced from and integral with the shaft 1, forming the rearmost portion thereof.

The torque converter housing 28 comprises, in addition to the aforementioned front portion 27, a rear portion 37, the portions 27 and 37 being provided with annular radially extending flanges at their outer peripheries connected together with suitable means, such as bolts 38.

The housing portion 37 is generally semi-toroidal and internally carries a plurality of conventional impeller blades 39 which are secured thereto and which comprise elements of a conventional torque converter 41. The housing portion 37 is fixedly mounted, as at 43, to a suitable shaft 43 adapted to drive a fluid pump for keeping housing 28 full of converter fluid in conventional manner. The torque converter 41 further comprises a conventional vaned runner assembly 44, which also is of semi-toroidal form, and which is provided with an inner flange 45 fixedly mounted to an annular hub 46 which has a splined connection 47 with the adjacent portion of a driven or transmission shaft 48, suitable bearing means being provided between the hub 46 and the flange 36 as illustrated in Figure 2. As illustrated in Figure 2, the shaft 48 is provided with an internal, longitudinally extending opening 48′ which extends therethrough, and the left end of shaft 48 (from the view of Figure 2) is piloted in a chamber 49 formed in the rearmost portion of the shaft 1. The chamber 49 is in fluid communication with a plurality of radially extending openings which communicate the chamber 49 with angularly extending opening means 50, adapted to carry fluid from opening 48′ and the chamber 49 to the space between the annular piston 32 and the adjacent radially extending part of housing portion 27. The torque converter 41 further comprises the conventional vaned stator assembly 51 which has a stator shell portion 52 attached at its inner periphery to a ring 53. The ring 53 provides an outer race for the tiltable sprags or grippers 54 of a one-way engaging assembly 55 which may be considered in accordance with the teachings of the aforementioned copending application of Harry P. Troendly et al. A second ring 56, concentric with the ring 53 defines the inner race of the one-way engaging assembly 55 and is splined at 57 to one end of a hollow shaft 58 surrounding a portion of the transmission shaft 48. As illustrated in Figure 2 suitable bearing means were provided to maintain the concentricity of, and the proper spacing between, the rings 53 and 56 of the one-way engaging assembly 55. The hollow shaft 58 may be secured to the housing in conventional manner, and the annular space between shaft 58 and shaft 48 serving as a fluid conduit to carry converter fluid from the converter pump to the interior of housing 28.

Referring now to Figure 1, which schematically represents a power takeoff unit adapted to be associated with the above described embodiment of the present invention, there is illustrated the previously mentioned pump 19 connected to a sump 61 by a fluid conduit 62. The pump 19 is driven by the shaft 18 to draw fluid from the sump 61 and discharges fluid under pressure into a conduit 63, which is in communication with a conventional pressure regulator valve 64. Inasmuch as these regulator valves are well known and widely utilized, it will be sufficient to indicate that the valve 64 is provided with a spring which serves, in conjunction with the fluid forces on a movable valve shuttle, to maintain the discharge pressure from the valve 64 relatively constant. The valve 64 operates to "dump" or return fluid to the sump 61 through a suitable conduit 65 in the event that the pressure supplied to the valve 64 is excessive. The valve 64 is connected by fluid conduit 65a to a conventional control valve 66, which may be manually or automatically operated. Fluid supplied to the control valve 66 from the conduit 65a may be directed, by appropriate movement of a rectilinearly movable valve shuttle 67, through a fluid conduit 68 or 69 to one end of a double acting fluid motor 71. The motor 71 comprises a movable piston 72, disposed in a cylinder 73, having one end connected to an auxiliary operating device, such as a loader scoop. As will be readily understood by those skilled in the art, if the valve shuttle 67 were moved upwardly from the position illustrated in Figure 1, fluid would flow from pump 19, valve 64, the conduit 65a, through the valve 66 and conduit 68 to the upper end of the fluid motor 71, effecting downward movement of the piston 72 and corresponding movement of the auxiliary work device connected thereto. Fluid beneath the piston 72 would be exhausted through the conduit 69, the valve 66, and a fluid conduit 74 interconnecting the opposite ends of the valve 66 with the sump 61. Obviously if the valve shuttle 67 were moved downwardly from the position illustrated in Figure 1 the reverse movement of the piston 72 would occur, and the implement attached to the piston 72 would similarly move in the opposite direction.

Figure 4:
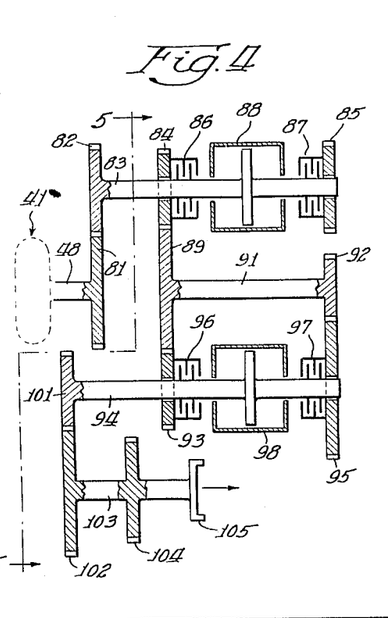
Figure 4 is a schematic representation in section taken along the plane of line 4—4 of Figure 5 of one form of transmission gearing means which may be associated with, and driven from, the torque converter illustrated in the previous figures.
Figure 5:
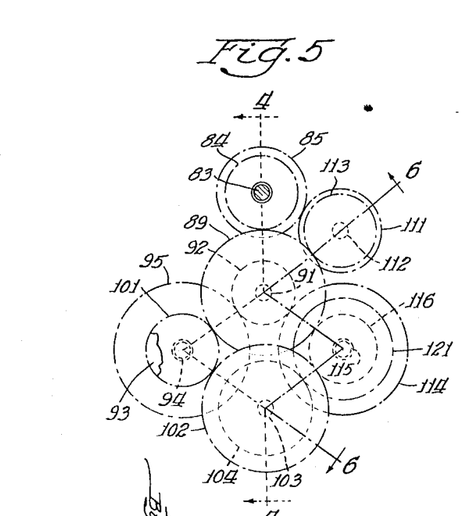
Figure 5 is a sectional view along the plane of line 5—5 of Figure 4.
Figure 6:
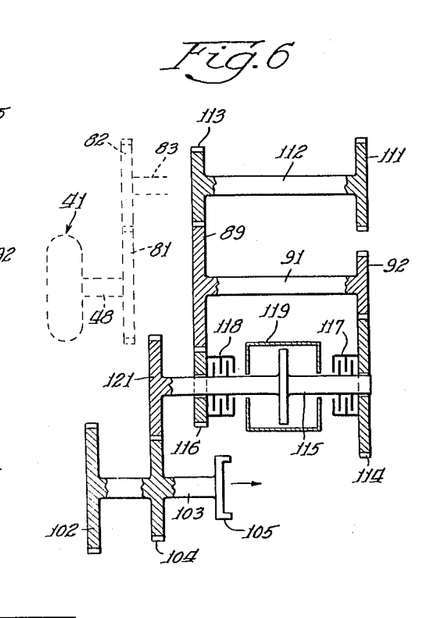
Figure 6 is a sectional view along the plane of line 6—6 of Figure 5.
Figure 7:
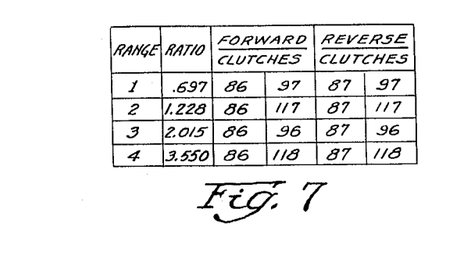
Figure 7 is a table setting forth the speed ratios and the clutches engaged in the several speed ranges.

In Figures 4, 5 and 6 there is schematically disclosed one form of transmission suitable for the transmission of power from the torque converter 41 to the driving wheels of the vehicle in which the device incorporating the principles of the present invention is disposed. As illustrated particularly in Figure 4, the output shaft 48 is connected to a gear 81 in constant mesh with a gear 82 fixed upon a rotatable shaft 83. Rotatably disposed about the shaft 83 are gears 84 and 85 of different diameters adapted to be clutched to the shaft 83 by clutches 86 and 87, respectively, upon operation of the selector device illustrated at 88. Gear 84 is in constant mesh with a gear 89 fixed to a rotatable shaft 91, which carries at its opposite end a gear 92 of smaller diameter than the gear 89. The gear 89 is in constant mesh with a gear 93 rotatably disposed about a shaft 94; also rotatably disposed about the shaft 94 is a gear 95 of larger diameter than the gear 93 and in constant mesh with the gear 92. Gears 93 and 95 are connectable to the shaft 94 by clutches 96 and 97, respectively, operation of these clutches being effected by a control member 98. Fixedly mounted upon the shaft 94 is a gear 101 which is in constant mesh with a gear 102 fixed to a shaft 103. The shaft 103 also has fixedly mounted thereon a smaller gear 104 and is provided with an end portion 105 adapted for connection to the driving wheels of the vehicle. As illustrated in Figures 5 and 6, there is also provided a gear 111 in constant mesh with the gear 85, gear 111 being carried on a shaft 112 upon which there is also fixedly carried a gear 113 of smaller diameter than the gear 111, gear 113 being in constant mesh with the gear 89.

Gear 92 is in constant mesh with a gear 114 rotatably disposed about a shaft 115; also rotatably disposed on this shaft is a gear 116 of smaller diameter than the gear 114 which is in constant mesh with the gear 89. Clutches 117 and 118 are provided to connect, respectively, the gears 114 and 116 to the shaft 115, these clutches being operable by a control device 119. Fixedly mounted upon one end of the shaft 115 is a gear 121, in constant mesh with the aforementioned gear 104 and the output shaft 103.

As is readily apparent to those skilled in the art, in the above described countershaft transmission the control devices 88, 98 and 119 are arranged so that they can engage only one of the two clutches controlled thereby at any one particular time. Preferably the clutches and control devices are constructed in accordance with the teachings of the copending U.S. patent application of Elmer A. Richards et al., Serial Number 593,479, entitled "Double Hydraulic Operated Clutch Device," now Patent No. 2,920,732 dated January 12, 1960. This countershaft type provides for four forward speed drives and four reverse speed drives. As illustrated in the chart associated with Figures 4, 5 and 6, clutches 86 and 87 control forward and reverse drive through the transmission respectively. First forward speed range through this countershaft transmission is accomplished by engagement of clutches 86 and 97 only. Second forward speed range through this transmission may be accomplished by engagement of clutches 86 and 117 only; third forward speed by engagement of clutches 86 and 96 only, and fourth forward speed by engagement of clutches 86 and 118 only. Examples of various desirable speed ranges, accomplished by the proper selection of gears, with these various clutches engaged is indicated in the "Ratio" section of the aforementioned chart. Reverse drive is accomplished by disengagement of clutch 86 and engagement of clutch 87; first through fourth speed ranges in reverse drive are then obtained by successive respective engagement of clutches 97, 117, 96 and 118.

*Operation*

When the engine of the vehicle in which the device of the present invention is disposed operates, shaft 1 will be rotated thereby to effect rotation of the torque converter housing 28 at a particular speed ratio with respect to the engine, as more particularly described hereinafter; housing portion 37 will effect rotation of shaft 43 which, as previously described, drives a converter fluid pump adapted conventionally to force torque converter fluid through the annular opening between the shafts 48 and 58, through suitable openings in the bearings associated with one-way clutch 55, and into the torque converter housing 28 to maintain it full of torque converter fluid. As previously indicated, shaft 18 will be continuously rotated to drive the pump 19 whenever the engine operates.

Assuming the vehicle is to be driven at high speed conditions, for example, along the highway, the vehicle operator will move a master control valve (not shown) to such a position that fluid under a pressure higher than that normally found in the torque converter housing 28 will pass through the elongated opening 48' in shaft 48, through chamber 49 and opening means 50 into the chamber formed at the left of piston 32, as viewed in Figure 2. Piston 32 will thereby be forced to the right in the view of Figure 2, and will effect clamping engagement with the clutch plate 34 holding it in firm, driving engagement with abutment 33 which, as previously described, is fixed to the converter housing 28. Torque from the engine then passes through shaft 1, flange 36 thereon and clutch plate 34 to converter housing 28. It will be seen that under these conditions converter housing 28 will be rotated at the same speed as shaft 1. In conventional manner, this rotative drive is transmitted from housing portion 37 to the impeller blades 39, the torque converter 41 operating in conventional manner to transmit hydrodynamic torque to the driven or transmission shaft 48. Assuming that the countershaft transmission is in first forward speed, this rotative torque is transmitted by shaft 48 to gear 81, gear 82, gear 84, gear 89, shaft 91, gear 92, gear 95, shaft 94, gear 101, gear 102, shaft 103 and through the end portion 105 thereof to the driving wheels of the vehicle. It is believed that the other forward and reverse speed drive paths through the transmission are readily apparent. During the entire period in which the connection between the clutch plate 34 and the torque converter housing is maintained, the structure will operate in accordance with the conventional torque converter-transmission arrangement, the torque converter absorbing full power from the engine, which it transmits to the transmission associated therewith.

When it is, however, desirable to operate the auxiliary equipment provided with the vehicle, such as a loader, the device of the present invention is arranged so that the torque absorbed by the converter is materially decreased, making additional torque from the engine available to operate this auxiliary equipment. To accomplish this advantageous result, the vehicle operator may move the master control valve (not shown) to relieve the high pressure in the chamber to the left of piston 32 (Figure 2) so that the piston 32 is forced to move back to the position illustrated in Figure 2 by the pressure of the torque converter fluid. In this condition, the clutch plate 34 is no longer fixed to the converter housing 28 so that relative motion between the housing 28 and the clutch plate 34—and consequently between the housing 28 and the shaft 1—may occur. Shaft 1 will, of course, continue to be rotated by the engine. Power is then transmitted through gears 2 and 5 to the one-way clutch 8, which is so arranged as to wedge between gear 5 and shaft 6 under these conditions so that shaft 6 is rotated, which will effect rotation of gears 22 and 25. Inasmuch as gear 25 is splined to flange 26 on portion 27 of the torque converter housing 28, the housing 28 will be rotated to effect power flow through the torque converter 41. At this point it is essential to note the relative gear sizes in this power train. As illustrated in Figure 2, the gears 2 and 5 are substantially the same size; as a result the shaft 6 will be rotated at substantially the same speed as the shaft 1. The shaft 6 has a reduced diameter portion 21 which carries a small gear 22, which in turn drives the large gear 25. It will be readily apparent to those skilled in the art that as a result of this relationship, the converter housing 28 will be rotated at a speed which is slower than the speed of the shaft 1.

Before proceeding further with the discussion of the operation, a comparison of the two operating conditions will be made. The torque absorbed by the converter varies—assuming a fixed ratio between the converter turbine speed and the converter impeller speed—as the square of the converter input speed. The converter is chosen in size and capacity to absorb the full engine torque when the input speed to the converter is the same as the speed of the shaft 1. Stated in other words, when the clutch plate 34 is fixedly connected to the converter housing 28, the converter 41 will absorb all the engine torque, transmitting it to the speed change transmission between the converter and the driving wheels of the vehicle. Further assuming a three to one torque ratio converter, and assuming that the impeller would absorb 100 lb. ft. torque when driven at 20 r.p.m., the turbine would deliver 300 lb. ft. of torque. If the impeller speed was reduced to 10 r.p.m. (that is if the impeller speed was reduced 50%), the impeller would absorb only 25 lb. ft. of torque, and the turbine would deliver 75 lb. ft. of torque to the countershaft transmission. In addition, the gear set between the engine and the converter obviously affects the torque requirements from the engine itself. Making the further assumption that this gear set provided a two-to-one ratio, and keeping in mind the fact that in this example the torque absorbed by the converter at the low speed was only ¼ of that which was absorbed at the high speed, the engine torque required to drive the converter at the low speed —being a product of the converter change and the gear set change—is only ⅛ that required at the high speed.

Continuing with the description of the operation with the device in the condition as illustrated in Figure 2, the torque absorbed by the converter 41 will be, as previously described, substantially reduced making additional engine torque for driving the auxiliary equipment available. This engine torque is transmitted to such auxiliary equipment through the gears 2, 5 and 16, the latter gear driving input shaft 18 to the pump 19 (Figure 1). The description of the operation of this auxiliary equipment was made hereinabove in the description of Figure 1. Simultaneously the converter 41 will transmit power to the shaft 48, in the manner previously described, to provide reduced tractive effort to the driving wheels of the vehicle through the transmission.

When it is desired to supply all of the torque capacity of the engine to the converter 41, fluid under high pressure is once again supplied to the opening 48' in the shaft 48 from whence it is transmitted to the chamber 49 and opening means 50 to effect movement of piston 32 to the right, from the view of Figure 2, so that the clutch plate 34 is once again fixedly connected to the housing 28, whereby the impeller of the torque converter 41 is driven at the same speed as the shaft 1. The converter 41 may then, once again, absorb the full torque capacity of the engine, transferring it to the driving wheels of the vehicle through the transmission.

Figure 3:
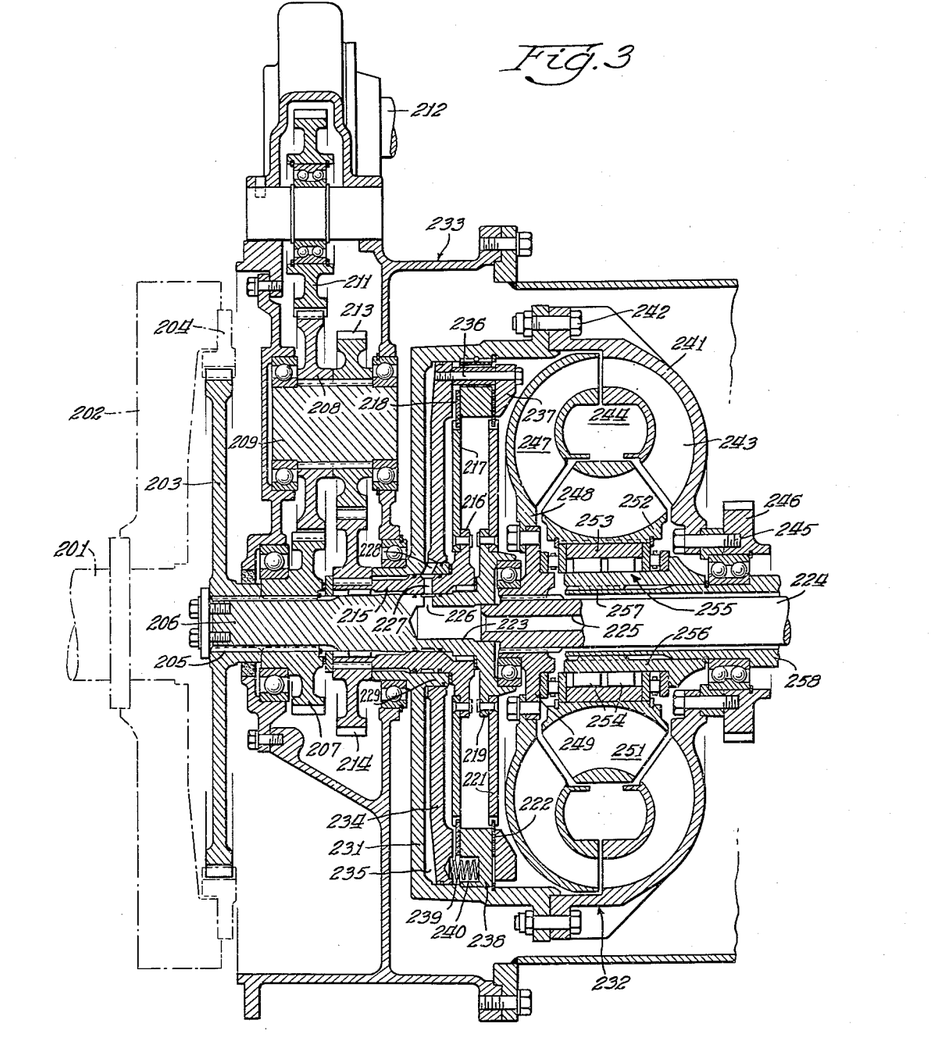
Figure 3 is a cross sectional view, similar to Figure 2, illustrating an improved embodiment of the present invention.

In Figure 3 there is shown an improved modification of the present invention, in which engine braking is provided at all times. In that figure there is illustrated schematically a shaft 201, constituting the output shaft of the engine, connected to an annular flywheel 202. The flywheel 202 is connected to an annular gear 203 by vibration damping means 204, the gear 203 being splined at 205 to a shaft 206. Splined to shaft 206 is a gear 207 having external teeth in constant engagement with the teeth of a gear 208 which is splined to a shaft 209. The gear 208 is also disposed in constant engagement with cooperative teeth on a gear 211 adapted to mesh with another gear (not shown) which is splined to a shaft 212. Shaft 212 serves as an input shaft to drive a pump, such as the pump 19, utilized in conjunction with auxiliary power equipment. From this description it will be seen that under all conditions in which the engine is operating, the input shaft 212 of the fluid pump will be rotated.

Also splined to the shaft 209 is a gear 213 having external teeth in constant engagement with a gear 214, which is in turn splined to an annular shaft 215 which has at its innermost end a radially extending, annular flange 216. To flange 216 there is fixedly attached an annular clutch plate 217, provided with an annular band of friction material 218 at its outer periphery. As illustrated in Figure 3, suitable bearing means are provided between the shaft 215 and the shaft 206 so that these members are rotatable relative to each other, and it is also significant to note that the gear ratios provided by the gears 207, 208, 213 and 214 are such that the shaft 215 will rotate at a speed which is slower than that of shaft 206.

The innermost portion of shaft 206 is provided with an annular, radially extending flange 219 to which is fixedly connected an annular clutch plate 221 which carries at its outer periphery an annular friction facing 222. The innermost end of shaft 206 is further provided with a chamber 223. This chamber receives one end of a transmission input shaft 224, and is in fluid communication with a longitudinally extending opening 225 provided within shaft 224. Also in communication with the chamber 223 are radially extending ports 226 in shaft 206 which communicate with radial ports 227 in the shaft 215. These ports 227 are in fluid communication with opening means 228 in an annular flanged portion 229 integral with an annular, cup shaped forward part 231 of a torque converter housing, indicated in general by the numeral 232. The part 231 is rotatably supported from an outer casing 233, and is rotatably mounted with respect to the shaft 215. Mounted on the flange 229 of the forward part 231 is an annular piston 234 spaced rearwardly from the part 231 to define a chamber 235 therewith. The piston 234 is provided at spaced points about its periphery with threaded openings adapted respectively to receive complementary ends of bolts 236 which serve to mount a ring 237 to the piston 234 and in effect make these members integral. The bolts 236 extend through suitable spaced openings in an abutment block 238 fixed against axial movement relative to the converter housing 232. As illustrated best in the lower portion of Figure 3, a plurality of springs 239 spaced circumferentially from each other are respectively disposed in suitable openings 240 in block 238 and serve to bias the piston 234 forwardly, or to the left, from the view of Figure 3. The effect of this bias—together with the force on piston 234 due to the pressure of the torque converter fluid in housing 232—is a normal clamping engagement between the clutch plate 221 and the abutment block 238 so that the plate 221 is connected to the converter housing 232; simultaneously, clutch plate 217 may rotate freely with respect to the abutment block 238, and therefore also with respect to the converter housing 232.

The housing 232 further comprises a semi-toroidal part 241, the parts 231 and 241 being provided with radially extending flanges at their outer periphery fixedly connected together by bolts 242. Part 241 internally carries a plurality of conventional impeller blades 243 which are secured thereto and which comprise elements of a conventional torque converter 244. Housing part 241 is fixedly mounted, by means such as bolts 245, to a suitable gear 246 adapted to drive a fluid pump (not shown) for keeping housing 232 full of converter fluid in conventional manner.

The torque converter 244 further comprises a conventional vaned runner assembly 247, also of semi-toroidal form, provided with an inner flange 248 fixedly mounted to an annular hub 249 splined to the shaft 224. The torque converter 244 further comprises a conventional vaned stator assembly 251 which is a shell portion 252 connected at its inner periphery to a ring 253. The ring 253 provides an outer race for tiltable sprags or grippers 254 of a one-way engaging assembly 255, which may be constructed in accordance with the teachings of the aforementioned patent application of Harry P. Troendly et al. A second annular member 256, concentric with the ring 253, defines the inner race of the engaging assembly 255, and is splined at 257 to one end of a hollow shaft 258 surrounding a portion of the transmission shaft 224. The hollow shaft 258 may be supported from the housing in conventional manner, and the annular space between the shafts 224 and 258 serves conventionally as a fluid conduit to carry converter pump to the interior housing 232.

The operation of this preferred embodiment of the invention will be discussed. Manifestly the shaft 224 is adapted for connection with the countershaft transmission in the same manner as shaft 48 as previously described, or to any other form of transmission. As previously described, at all times when the engine is operating the shaft 202 and gears 207, 208 and 211 will effect rotation of the shaft 212 so that the fluid pump for operating the auxiliary equipment will be operated at all times during engine operation. In the condition of the device illustrated in Figure 3, wherein clutch plate 221 is clamped to abutment block 238, rotation of the shaft 206 will be imparted to the clutch plate 221 and through block 238 to the converter housing 232. The impeller 243 will therefore rotate at the same speed as shaft 206; the converter 244 is chosen, as previously described, under these circumstances to absorb the full torque output of the engine. The vehicle may therefore be driven with this full engine torque, transmitted through the converter 244 of the transmission to the driving wheels of the vehicle. If the operator desires to reduce the amount of torque through the converter 244 and increase the amount of torque available for operation of the auxiliary equipment, he may operate a master control valve (not shown) to supply fluid, at a pressure substantially in excess to that in the torque converter housing 232, through opening 225 in shaft 224 and into chamber 223 in the shaft 233. This high pressure fluid will flow through ports 226, 227 and 228 into the chamber 235. This highly pressurized fluid will effect rearward axial motion (to the right in Figure 3) of the piston 234 against the bias of the springs 239 and the force due to the pressure of the torque converter fluid. As this occurs, ring 237—which is carried by the piston 234—will also be moved to the right, releasing the clutch plate 221 from its connection to the block 238, so that clutch plate 221 (and consequently shaft 206) may rotate relative to the housing 232. Subsequently piston 234 will clamp clutch plate 217 to the block 238; torque is then transmitted from the shaft 206 to the gears 207, 208, shaft 209, gears 213, 214 and shaft 215 to clutch plate 217, and through abutment block 238 to the converter housing 232. The gears 207, 208 and 214 are chosen, as illustrated in Figure 3, to drive shaft 215 at a speed slower than the speed of shaft 206 so that in this condition of the device the impeller 243 of the converter 244 will be driven at a speed which is slower than the speed of shaft 206. As previously described, under this condition, the converter 244 will absorb substantially less torque than under the previously described condition in which the converter was driven at the speed of shaft 206, the additional engine torque being available for operation of the auxiliary equipment.

When the additional torque to the auxiliary equipment is no longer necessary, the vehicle operator may move his master control valve to a position in which the fluid pressure in the chamber 235 is released or "dumped"; springs 239, and the pressure of fluid in the converter housing 232, will then effect axial movement of piston 234 toward the left, from the view of Figure 3. Initially this will result in release of the clutch plate 217 from its clamping engagement with the abutment block 238, and consequently interrupt the connection between the shaft 215 and the housing 232 so that these elements may rotate relative to each other. Further movement of the piston 234 will occur until the parts occupy the position illustrated in Figure 3, in which the clutch plate 221 is clamped to the abutment block 238 by the ring 237 with a force determined by the spring 239 and the converter fluid pressure in the housing 232. As previously described, under these conditions the shaft 206 is directly connected to the housing 232 so that the speed of the impeller 243 will be the same as that of the shaft 206 and the converter 244 may once again absorb the engine torque.

Figure 3A:
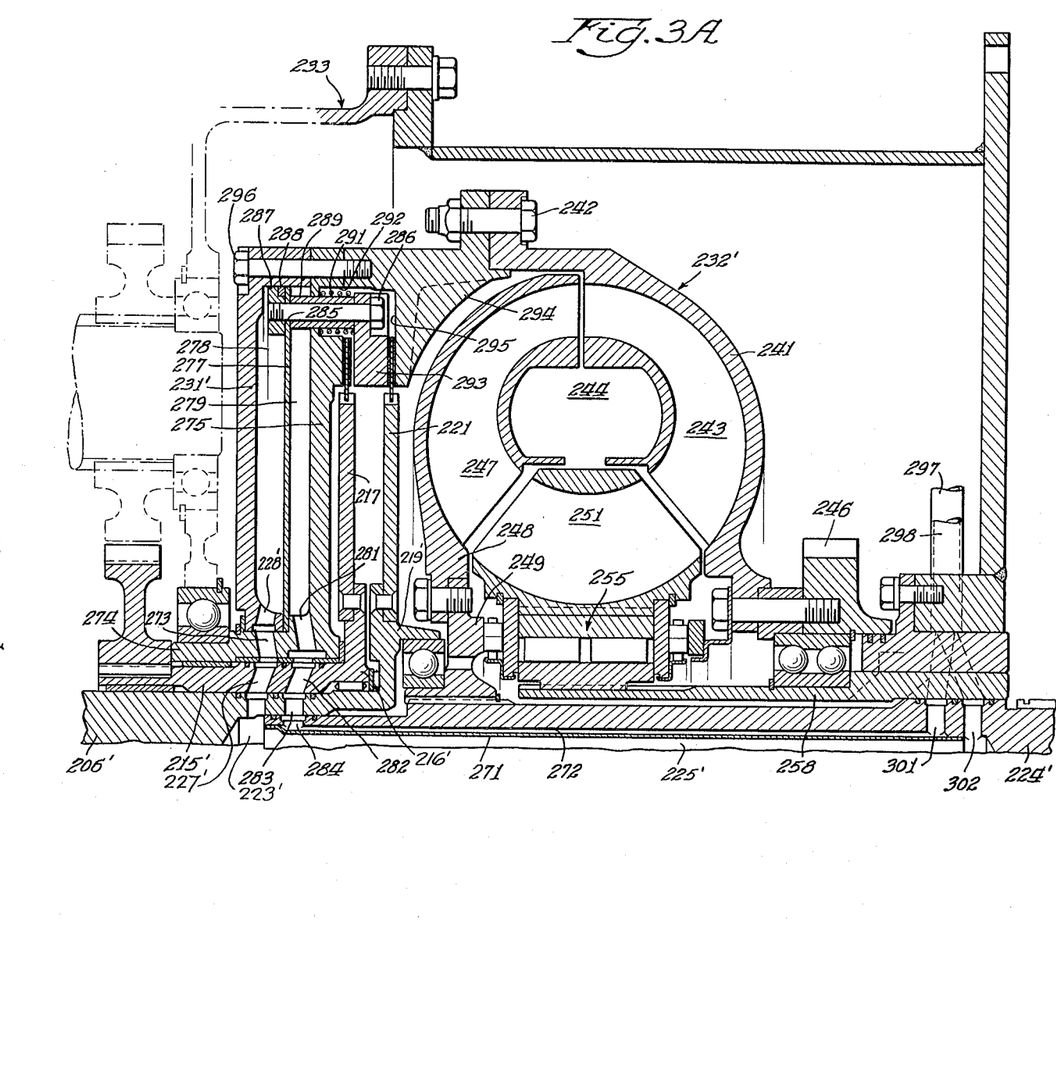
Figure 3A is an elevational sectional view, similar to Figure 2, but showing a further modified form of the present invention.

In Figure 3A there is shown another improved modification of the present invention, in general similar to that illustrated in Figure 3. The numerals in Figure 3A identical with those in Figure 3 relate to parts which are identical in the two embodiments; the numerals in Figure 3A which are the same as those in Figure 3, but with the prime added, identify parts that are substantially identical with those in Figure 3. Provided is a shaft 206', identical with the shaft 206 except as hereinafter noted, connected to the flywheel 202 as previously described and carrying gear 207 (Figure 3). Rotatably mounted about the shaft 206 by suitable bearing means is the shaft 215', splined to the gear 214, and having on its innermost end a radially extending, annular flange 216'. The annular clutch plate 217 is fixedly attached to the flange 216'. As before described, the gear ratios provided by the gears 207, 208, 214 (Figure 3) are such that the shaft 215' will rotate at a speed slower than that of the shaft 206'.

The innermost portion of shaft 206' is provided with an annular, radially extending flange 219' to which is fixedly connected the annular clutch plate 221. The innermost end of the shaft 206' is provided with an elongated chamber 223' which receives one end of the transmission input shaft 224', and which is in fluid communication with an elongated, longitudinally extending, annular, fluid impervious tube 271 provided within a longitudinally extending opening 225' provided within the shaft 224'. As illustrated in Figure 3A, an annular space 272 is defined by the sides of the opening 225' and the exterior of the tube 271, this opening 272 being isolated from the chamber 223' and the interior of the tube 271, as illustrated in Figure 3A. The ports 226' in shaft 206' are in fluid communication with ports 227' provided in the shaft 215', which are in turn in fluid communication with ports 273 provided in an annular flange 274 which projects longitudinally from an annular, radially extending abutment member 275, to be more fully described hereinafter. As shown in Figure 3A, the shaft 215' is rotatably mounted with respect to the shaft 206', and the flange 274 is rotatably mounted with respect to the shaft 215'. These ports 273 are in fluid communication with opening means 228' in an annular, longitudinally extending flange portion integral with an annular, cup shaped forward part 231' of a torque converter housing, indicated in general by the number 232'. There is also provided a flexible, annular diaphragm piston 277 which has an annular inner, central opening seated upon a portion of the flange 274; the inner portion of this piston 277 is clamped between radially extending shoulders provided on the flange 274 and the forward part 231'. The diaphragm piston 277 is preferably formed with a fluid impervious material such as steel approximately 1/8" thick, so that an annular chamber 278 is defined by the piston 277 and the part 231', another annular chamber 279 being defined by the piston 277 and the abutment 275. This latter chamber 279 is connected by ports 281 in the abutment 275, 282 in the shaft 215', ports 283 in the shaft 206' and ports 284 in the shaft 224' to the chamber 272. It will therefore be seen that the interior of the tube 271 is in fluid communication with the chamber 278, while the annular chamber 272 is in fluid communication with the chamber 279, and that there is no interflow between chambers 278 and 279.

The exterior portion of the piston 277 if provided with a plurality of circumferentially spaced, circular openings 285 through which respectively extend portions of a plurality of bolts 286 having threaded ends engaged by nuts 287. The nuts 287 are provided with openings through which extend a sealing ring 288 to aid in isolating the chambers 278 and 279. Surrounding each of the bolts 286 is a tubular spacer member 289, the spacer members 289 respectively extending through circumferentially spaced, circular openings provided in the exterior portion of the abutment 275. Surrounding the innermost portion of each of the spacers 289 is a spring 291, one end of each abuts a wall defining one end of a suitable opening 292 in the abutment 279 associated with each of the openings extending therethrough; the other end of each of the springs 291 abuts against an annular block 293 adjacent to an intermediate part 294 of the torque converter housing 232'. The block 293 is provided with a plurality of circumferentially spaced openings through which the bolts 286 respectively extend; the heads of these bolts engaging an offset, radially extending wall in the block 293 as illustrated in Figure 3A. From the foregoing description it will be apparent that the block 293 is rigidly connected to the piston 277, and will be moved axially in response to axial movement of the outer portion of the piston 277, as described subsequently. As illustrated in Figure 3A, the annular ring of friction material on the clutch plate 217 is disposed between the fixed abutments 275 and the ring 293; the clutch plate 221 is disposed between the ring 293 and a radially inwardly extending, annular wall 295 formed on an intermediate part 294 of the torque converter housing 232'. The springs 291 bias the ring 293 toward this wall 295, tending to effect a clamping engagement of the clutch plate 221 with the intermediate part 294 of the housing 232'.

The radially outer portions of the forward part 231', the abutment 275, and the intermediate portion 294 are respectively provided with a plurality of circumferentially spaced openings disposed in registry and respectively adapted to receive bolts 296 which serve to fix the forward part 231', the abutment 275 and the intermediate part 294 together and to make these parts, in effect, integral. A plurality of suitable bolts 242 are provided, as previously described with regard to Figure 3, to fix the intermediate part 294 of the housing to the rearmost portion 241 thereof.

Conventional fluid supply means, comprising a fluid pump, a valve and a sump or reservoir are provided (not shown) conventionally connected to conduit means 297 and 298, respectively in fluid communication through suitable porting with ports 301 and 302 in the shaft 224'. The porting 301 is in fluid communication with the annular chamber 272, and the porting 302 is in fluid communication with the interior of the tube 271 as shown in Figure 3A, the ports 301 and the ports 302 being isolated from each other fluidwise, except through the aforementioned fluid supply means.

The spring 291 normally biases the ring 293 in such a manner that the clutch plate 221 is in tight engagement with the torque converter housing 232'. Torque from the engine is transmitted through the shaft 206' to the clutch plate 221, to the housing 232', and further to the torque converter 244 in the manner previously described. High pressure fluid is supplied after the engine is started through the conduit means 298, through tube 271, to the chamber 278 to aid this rearward movement of the ring 293 and effect the holding action of the clutch plate 221 to the housing 232'. Clutch plate 217 may rotate freely relative to housing 232'. When it is desired to rotate the impeller 243 of the torque converter 244 at a slower speed, the high pressure fluid is exhausted from the chamber 278, the tube 271 and the conduit 298, while highly pressurized fluid is forced through the conduit means 297, porting 301, the annular chamber 272, into the chamber 279. The presence of this highly pressurized fluid in the chamber 279 effects flexure of the diaphragm piston 277, the outermost end thereof moving to the left, in the view of Figure 3A. This will effect movement of the ring 293 toward the left, away from the clutch plate 221 against the bias of springs 291—clutch plate 221 therefore may rotate freely without connection to the housing 232'—the ring 293 subsequently clamping the clutch plate 217 to the abutment 275. Torque will then be transmitted from the engine to shaft 206', gears 207 and 208, shaft 209, gears 213 and 214 to shaft 215', clutch plate 217, and abutment 275 to the housing 273'. The impeller 243 of the converter 244 will therefore rotate at a speed slower than that of the shaft 206', as previously described. The converter 244 will, under this condition, absorb less torque, so that additional torque is transmitted to the auxiliary equipment. When it is once again desired to have the torque converter housing 244 absorb all of the engine torque, the operator effects movement of his master valve in such a manner that the conduit 297 is disconnected from the source of high pressure fluid and is connected to the sump, while the conduit 298 is connected to the source of high pressure fluid. The high pressure fluid will therefore be exhausted from the chamber 279, the annular opening 272 and the porting 301, while high pressure fluid will once again be supplied to the chamber 278. Diaphragm piston 279 will flex so that the outer portion thereof moves toward the right, in the view of Figure 3A, under the influence of this high pressure fluid in the chamber 278 assisted by the bias of springs 291, so that the ring 293 is moved toward the right; initially this releases the clutch plate 217 from engagement with the housing 232', so that the plate 217 may rotate freely relative thereto, and subsequently once again clamps the clutch plate 221 to the housing 232', whereby the impeller 243 of torque converter 244 is once again driven at the speed of the shaft 206'.

It should be understood that the present invention is not limited to utilization with countershaft type transmissions nor to the particular type of auxiliary equipment shown in Figure 1.

It is important to notice that in all of the embodiments of the present invention described above, if a two-to-one gear ratio between the engine and converter is utilized (although it should be understood that this particular ratio is not essential as many other ratios may also be utilized), the speed of the impeller may be reduced to one-half of its speed in direct drive. Under this circumstance (assuming constant engine speed) the converter will absorb one-fourth of the torque which it absorbs in direct drive. Furthermore, because of the "gear change" between the engine and the converter, the amount of torque absorbed by the converter is actually twice the engine torque; the engine torque required, therefore, to drive the converter when it is driven at its reduced speed is only one-eighth (assuming the two-to-one ratio) of that required to drive the converter when it is directly driven. Therefore seven-eighths of the engine torque is available under this reduced speed condition for other work. While the output torque of the converter in this low input speed condition would be only one-fourth of the converter output torque in its directly connected, high speed condition, the ratio between the converter output torque and the engine torque required to drive the converter is doubled permitting usage elsewhere of the available engine torque by this "gear shift," e.g., to drive hydraulic pump.

The foregoing description has related to a converter which is matched to the engine in such a manner that the converter during direct drive may absorb all of the engine torque and the "gear shift" is used to reduce the converter speed below that of the engine speed. If desired, a different relationship could be utilized in which a smaller converter than that described above would be employed and the "gear shift" would be arranged to overdrive the converter when tractive effort of the vehicle was required, while driving the converter "directly" when it was desired to utilize the auxiliary equipment. Similar devices may be constructed in accordance with the present invention in which the converter is matched the engine in such a way as to absorb the full engine torque at stall, the converter being driven directly from the engine as previously described, while the "gear change" is arranged to increase the impeller speed so that the engine torque available to drive the converter is reduced because of the ratio change between the engine and the converter. With such an arrangement, in the direct drive relationship maximum torque is available in the lower speed or direct range, while in the other drive range the converter operates with respect to the engine as a very large converter would and provides very large torque outputs at high speeds.

It is also very important to notice that with all devices constructed in accordance with the present invention, optimum operating characteristics are achieved throughout the entire work range of the vehicle. In this regard the net result obtained with such devices is significantly better than that achievable by utilizing two parallel converters of different sizes inasmuch as in devices constructed in accordance with the present invention the torque multiplication of the entire drive line is multiplied by the ratio of converter torque to engine torque required to drive the converter.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. In a power transmitting mechanism, the combination comprising a shaft adapted to be driven from an engine; a torque converter having a stator, an impeller and a runner adapted to transmit torque to torque utilizing means; first clutch means adapted to connect said impeller to said shaft for rotation therewith, and means including second clutch means adapted to effect rotation of said impeller at a speed lower than that of said shaft when said first clutch means are disengaged.

2. In a power transmitting mechanism, the combination comprising a shaft adapted to be driven from an engine; a torque converter having a stator, an impeller and a runner adapted to transmit torque to torque utilizing means; first clutch means adapted to connect said impeller to said shaft for rotation therewith, means including second clutch means adapted to effect rotation of said impeller at a speed lower than that of said shaft when said first clutch means are disengaged, and power takeoff means driven from said shaft.

3. In a power transmitting mechanism, the combination comprising a shaft adapted to be driven from an engine, a torque converter having a stator, an impeller and a runner adapted to transmit torque to torque utilizing means; first clutch means adapted to connect said impeller to said shaft for rotation therewith, and means including countershaft gearing and second clutch means adapted to effect rotation of said impeller at a speed different from that of said shaft during disengagement of said first clutch means.

4. In a power transmitting mechanism, the combination comprising a shaft adapted to be driven from an engine; a torque converter having a stator, an impeller and a runner adapted to transmit torque to torque utilizing means; first clutch means adapted to connect said impeller to said shaft for rotation therewith, means including countershaft gearing and second clutch means adapted to effect rotation of said impeller at a speed different from that of said shaft during disengagement of said first clutch means, and power takeoff means driven from said countershaft gearing.

5. In a power transmitting mechanism, the combination comprising a shaft adapted to be driven from an engine; a torque converter comprising a housing, a plurality of impeller blades connected to said housing, a stator, and a vaned runner adapted to transmit torque to torque utilizing mechanism; a first clutch plate in said housing, means connecting said first clutch plate to said shaft for rotation therewith, a second shaft surrounding a portion of said first shaft, a second clutch plate in said housing connected to said second shaft for rotation therewith, gearing means between said second shaft and said first mentioned shaft adapted to effect rotation of said second shaft at a speed different from that of said first shaft, abutment means disposed within said housing and connected thereto intermediate said first and second clutch plates, and piston means in said housing operable to connect said clutch plates alternately to said abutment means to effect thereby rotation of said impeller with said first mentioned shaft or with said second shaft.

6. The device defined in claim 5 in which said gearing means effects rotation of said second shaft at a speed below that of said first mentioned shaft.

7. The device defined in claim 6 in which said gearing means effects operation of a fluid pump.

8. In a power transmitting mechanism, the combination comprising a shaft adapted to be driven from an engine; a torque converter comprising a housing, a plurality of impeller blades connected to said housing, a stator, and a vaned runner adapted to transmit torque to torque utilizing mechanism; a first clutch plate in said housing, means connecting said first clutch plate to said shaft for rotation therewith, a second shaft surrounding a portion of said first shaft, a second clutch plate in said housing connected to said second shaft for rotation therewith, gearing means between said second shaft and said first mentioned shaft adapted to effect rotation of said second shaft at a speed different from that of said first shaft, abutment means disposed within said housing and connected therewith for common movement, pressure plate means disposed in said housing between said clutch plates operable to connect said clutch plates alternately to said abutment means to effect thereby rotation of said impeller with said first mentioned shaft or with said second shaft, means defining a fluid-tight chamber in said housing, a piston in said chamber dividing said chamber into first and second fluid-tight portions, means adapted to supply pressurized fluid alternately to said first and second chamber portions to effect movement of said piston relative to said housing, and means connecting said piston to said pressure plate means whereby movement of said piston effects operation of said pressure plate means.

9. The device defined in claim 8, in which said piston comprises a metallic flexible diaphragm.

10. The device defined in claim 8, in which said gearing means effects rotation of said second shaft at a speed below that of said first mentioned shaft.

11. The device defined in claim 10, in which said gearing means effects operation of a fluid pump effective to operate an auxiliary work device.

12. In a power transmitting mechanism, the combination comprising a shaft adapted to be driven from an engine, a torque converter having a stator, an impeller and a runner adapted to transmit torque to torque utilizing means, first clutch means adapted to connect said impeller to said shaft for rotation therewith, and means including second clutch means adapted to effect rotation of said impeller at a speed different from that of said shaft when said first clutch means is disengaged, said second clutch means being operable normally to effect rotation of said impeller and being automatically disengageable when said first clutch means is engaged.

13. In a power transmitting mechanism, the combination comprising a shaft adapted to be driven from an engine; a torque converter having a stator, an impeller and a runner adapted to transmit torque to torque utilizing means; first clutch means adapted to connect said impeller to said shaft for rotation therewith, resilient means for normally urging said first clutch means into engagement, and means including second clutch means adapted to effect rotation of said impeller at a speed different from that of said shaft when said first clutch means is disengaged.

14. In a power transmitting mechanism, the combination comprising a shaft adapted to be driven from an engine; a torque converter having a stator, an impeller and a runner adapted to transmit torque to torque utilizing means; first clutch means adapted to connect said impeller to said shaft for rotation therewith, said clutch means being hydraulically actuated, and means including second clutch means adapted to effect rotation of said impeller at a speed different from that of said shaft when said first clutch means is disengaged.

References Cited in the file of this patent

UNITED STATES PATENTS

| | | |
|---|---|---|
| Re. 22,466 | Pollard | Apr. 4, 1944 |
| 2,376,699 | Jandasek | May 22, 1945 |
| 2,597,921 | Churchill et al. | May 27, 1952 |
| 2,724,973 | Swift et al. | Nov. 29, 1955 |

FOREIGN PATENTS

| | | |
|---|---|---|
| 484,584 | Great Britain | May 6, 1938 |
| 489,396 | Great Britain | July 6, 1938 |